US006515281B1

(12) United States Patent
Ohkawa

(10) Patent No.: US 6,515,281 B1
(45) Date of Patent: Feb. 4, 2003

(54) STOCHASTIC CYCLOTRON ION FILTER (SCIF)

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 147 days.

(21) Appl. No.: 09/602,518

(22) Filed: Jun. 23, 2000

(51) Int. Cl.[7] .......................... H01J 49/38; B01D 59/44

(52) U.S. Cl. ....................... 250/291; 250/282; 250/283; 209/12.1; 209/226; 210/222; 210/695; 210/748; 204/156; 95/28; 96/2; 96/3

(58) Field of Search ................................ 250/291, 290, 250/282, 283; 209/12.1, 227, 226; 204/156; 210/222, 695, 748; 95/28; 96/2, 3

(56) References Cited

U.S. PATENT DOCUMENTS 3,722,677 A 3/1973 Lehnert
4,081,677 A * 3/1978 Dawson ...................... 250/290
4,755,671 A * 7/1988 Friedland et al. ........... 250/298
4,761,545 A * 8/1988 Marshall et al. ............ 250/291
5,019,706 A * 5/1991 Allemann et al. .......... 250/291
5,039,312 A 8/1991 Hollis, Jr.
5,206,509 A * 4/1993 McLuckey et al. ......... 250/282
5,681,434 A 10/1997 Eastlund

* cited by examiner

*Primary Examiner*—Jack Berman
(74) *Attorney, Agent, or Firm*—Nydegger & Associates

(57) ABSTRACT

A stochastic cyclotron ion filter for separating ions in a multi-species plasma according to mass uses an electrical field (E) crossed with a magnetic field (B). In particular, the electric field is stochastically generated by an amplified noise source with a band pass filter that passes only frequencies in an interval between $\omega_1$ and $\omega_2$. The filter also includes a cylindrical chamber for receiving the multi-species plasma, and coils are used to generate the magnetic field inside the chamber. In operation, the stochastically generated electric field resonates with particles in the plasma that have a cyclotron frequency $\Omega$ in the frequency interval ($\omega_1<\Omega<\omega_2$). In one embodiment, an electrode is mounted at one end of the chamber, and the electrode is connected with the amplifier to establish the electrical field in the chamber. In another embodiment, an electromagnetic coil is mounted on the chamber and is connected with the amplifier to induce the electrical field in the chamber. For both embodiments, particles having resonant cyclotron frequencies $\Omega$ in the frequency interval ($\omega_1<\Omega<\omega_2$) are accelerated into larger orbital paths than other particles in the plasma and, thereby, are separated for collection.

21 Claims, 1 Drawing Sheet

STOCHASTIC CYCLOTRON ION FILTER (SCIF)

FIELD OF THE INVENTION

The present invention pertains generally to devices that are useful for separating particles (ions) of a predetermined mass from other charged particles in a multi-species plasma. More particularly, the present invention pertains to devices that accelerate selected particles (ions) at their cyclotron frequencies by using a resonant electric field to segregate and separate the selected ions from the plasma. The present invention is particularly, but not exclusively, useful for employing a stochastically generated electric field, having a predetermined band of frequencies, that will resonate with selected particles having respective cyclotron frequencies within the band of frequencies to thereby separate the selected particles from other charged particles in a plasma.

BACKGROUND OF THE INVENTION

Cyclotron resonance occurs under conditions wherein electromagnetic power is coupled into a system of charged particles. The consequence of this coupling is a phenomenon known as ion cyclotron resonance heating (ICRH). Simply stated, ICRH occurs when a charged particle (e.g. an ion) is positioned in a uniform magnetic field, and the frequency of the electromagnetic power is resonant with the cyclotron frequency of the charged particle. The result is that the charged particle is accelerated into a spiral path by the absorption of energy from the electromagnetic power.

In a basic cyclotron, the charged particles are accelerated by electromagnetic waves having a fixed frequency. It happens, however, that the maximum ion energy that can be attained using a fixed frequency is limited because there is a relativistic mass increase for the ions at very high energies. This increase in mass then breaks the synchronous relationship for resonance between the frequency of the electromagnetic power and the cyclotron frequency of the charged particles. To overcome this difficulty, the synchrocyclotron was invented to modulate the electromagnetic power, and to thereby compensate for the relativistic mass increase. The dynamic modulation of electromagnetic power that is required to maintain an operation that is synchronous with relativistic mass increases can, however, be problematical. Consequently, the stochastic cyclotron was invented to effectively make such an operation steady state. In essence, a stochastic cyclotron is able to provide random inputs, within a specified frequency range, which will statistically accelerate ions in the stochastic cyclotron so long as the relativistic mass increases and the consequent cyclotron frequencies of the ions remain within the range.

Insofar as plasma mass filters are concerned, it is known that the basic principles of ICRH can be applied to a multi-species plasma to separate charged particles of a selected mass from other particles in the plasma. For example, such a procedure is disclosed in U.S. Pat. No. 5,442,481, which issued to Louvet on May 13, 1994 for an invention entitled "DEVICE FOR ISOTOPE SEPARATION BY ION CYCLOTRON RESONANCE." Also an exemplary plasma mass filter has been recently disclosed by Ohkawa in U.S. Pat. No. 6,096,220 issued on Aug. 1, 2000 for an invention entitled "PLASMA MASS FILTER." This invention separates particles based on the magnitude of their mass charge ratio. Using this technology, it may sometimes be desirable to isolate and separate a group of charged particles that have nearly the same mass numbers. For instance, in one application it would be desirable to remove transuranic elements or fission fragments from nuclear waste. In this case the transuranic elements have mass numbers in the range of 235 to 240 and the fission fragments will have mass numbers in the range of 80 to 120. Most of the non-radioactive material will have mass numbers less than 60. In such a situation, it may be desirable to remove all of the particles having mass numbers in the range of 235 to 240 as well as particles having mass numbers in the range of 80 to 120. The mathematical development which describes how this condition can be realized is helpful.

In describing the acceleration of the ions, consider an example where the electric field $E_x$ is uniform and in x-direction. (The static magnetic field is in z-direction.) The time dependence is given by $$E_x = \int_{\omega l}^{\omega 2} F[\omega]\cos\omega t d\omega \quad \text{(Eq. 1)}$$

where F is the Fourier component. We choose the white noise spectrum between the frequencies $\omega_1$ and $\omega_2$, i.e.

$$F[\omega]=F \quad \omega_2 \geqq \omega \geqq \omega_1$$

$$F[\omega]=0 \quad \omega>\omega_2 \text{ and } \omega<\omega_1 \quad \text{(Eq. 2)}$$

The equations of the motion of the ions are given by $$Mdv_x/dt=ev_yB+eE_x$$

$$Mdv_y/dt=-ev_x$$

$$Mdv_z/dt=0 \quad \text{(Eq. 3)}$$

where M is the mass of the ions and B is the static magnetic field. We define u by $$u=\exp[i\Omega t][v_x+iv_y]$$

where $\Omega=eB/M$, and obtain $$u = [e/2iM]\int_{\omega l}^{\omega 2} F[\omega] \; [\{\exp[i\Omega t + i\omega] - 1\}[\Omega + \omega]^{-1} + \{\exp[i\Omega t - i\omega t] - 1\}[\Omega - \omega]^{-1}]d\omega + u_0 \quad \text{(Eq. 4)}$$

where the subscript 0 denotes the value at t=0.

The first term does not contain the resonance term and is neglected. The resonant part with F[1] given by Eq. 2 becomes $$u = [eF/2iM]\int_{\omega l}^{\omega 2}\{\exp[i\Omega t - i\omega t] - 1\}[\Omega - \omega]^{-1}d\omega + u_0 \quad \text{(Eq. 5)}$$

The above expression can be written in terms of Sine integral Si and Cosine integral Ci, $$u=[eF/2M]\{\{Si[\omega_2 t-\Omega t]+Si[\Omega t-\omega_1 t]+$$

$$i\{Ci[\omega_2 t-\Omega t]+Ci[\Omega t-\omega_1 t]-$$

$$1n[\gamma\{\omega_2-\Omega\}t]-1n[\gamma\{\Omega-\omega_1\}t]\}\}+$$

$$u_0 \quad \text{(Eq. 6)}$$

where $\gamma=1.781$.

For small values of the argument, consider $$Si[\xi]\rightarrow\xi$$

and $$Ci[\xi]\rightarrow 1n[\gamma\xi]$$

and obtain $$u\approx[eF/2M][\omega_2-\omega_1]t \quad \text{(Eq. 7)}$$

where $u_0=0$ is assumed.
The electric field strength E is given by $$E=[\omega_2\omega_1]F$$

and Eq. 7 becomes $$u\approx[eE/2M]t \quad \text{(Eq. 8)}$$

In the asymptotic limit, $$Si[\xi]\rightarrow\pi/2-\cos\xi/\xi$$

$$Ci[\xi]\rightarrow\sin\xi/\xi$$

By neglecting the logarithmic terms we obtain $$u\rightarrow[eF/2M]\pi=[eE/2M]\pi[\omega_2-\omega_1]^{-1} \quad \text{(Eq. 9)}$$

The velocities given by Eq. 8 and Eq. 9 show that the ions are accelerated initially at the rate equal to that for the single frequency resonance and the acceleration saturates after $\Omega/\{2[\omega_2-\omega_1]\}$ cyclotron cycles.

When the frequency interval $\omega_1$ to $\omega_2$ does not contain the cyclotron frequency $\Omega$, i.e.

$$\Omega<\omega_1<\omega_2 \text{ or } \Omega>\omega_2>\omega_1$$

the real part of the velocity given by Eq. 1 becomes $$Reu=[eF/2M]\{Si[\omega_2t-\Omega t]-Si[\omega_1t-\Omega t]\}\ \Omega<\omega_1<\omega_2 \quad \text{(Eq. 10)}$$

or $$=[eF/2M]\{Si[\Omega t-\omega_1t]-Si[\Omega t-\omega_2t]\}\ \Omega>\omega_2\omega_1$$

In either case, $$Reu\rightarrow 0 \text{ for } t\rightarrow\infty$$

The above expression shows that the acceleration does not occur unless the frequency interval contains the cyclotron frequency.

Another consequence of the mathematical development presented above is that a stochastic acceleration is tolerant of the stochasticity resulting from collisions between ions as they are being accelerated. This is in contrast with a typical cyclotron operation which uses a single fixed frequency to establish cyclotron resonance. In the case of the typical cyclotron (fixed frequency), collisions between both resonant and nonresonant ions will interrupt the synchronous (resonant) relationship between the input frequency of the electromagnetic power and the cyclotron frequency of the accelerated ions. Due to these collisions, the performance of the typical cyclotron is degraded. On the other hand, with a stochastic electromagnetic input, there is sufficient bandwidth to accelerate several ion species so long as the ions are in the appropriate range of masses. Further, any collisions that may occur between accelerated ions will not interfere with the acceleration as long as the collisional frequency of the ions ($\nu$) does not exceed the bandwidth ($\omega_2-\omega_1$) of the stochastic electromagnetic input ($\omega_2-\omega_2\geqq\nu$). A consequence of this is the possibility for a higher throughput.

In light of the above, it is an object of the present invention to provide a stochastic cyclotron ion filter that can selectively isolate and separate ions from a multi-species plasma that have mass numbers that are within a predetermined range of values. Yet another object of the present invention is to provide a stochastic cyclotron ion filter that can be operated to achieve a higher throughput. Still another object of the present invention is to provide a stochastic cyclotron ion filter that is relatively easy to manufacture, is easy to use, and is comparatively cost effective.

SUMMARY OF THE PREFERRED EMBODIMENTS

In accordance with the present invention, a stochastic cyclotron ion filter requires crossed electric and magnetic fields (E×B), wherein the electric field has RF electromagnetic power that results from using a stochastic input. More specifically, the stochastic input is generated by a white noise source, and a band pass filter that is connected with the noise source. As intended for the present invention, the band pass filter passes only those frequencies in the noise that are within a predetermined frequency interval, i.e. all frequencies that are in the bandwidth between a first frequency ($\omega_1$) and a second frequency ($\omega_2$). An amplifier is also provided, and is connected to the band pass filter to strengthen frequencies in the frequency interval.

In combination with the stochastic input, the present invention includes a substantially cylindrical shaped chamber that is provided to receive a multi-species plasma from a plasma source. The chamber defines a longitudinal axis and has a plurality of magnetic coils that are positioned around the chamber. Specifically, these magnetic coils are oriented in planes substantially perpendicular to the axis, in order to establish an axially oriented, uniform magnetic field (B) inside the chamber. Also, an oscillating electric field (E) is generated and oriented substantially perpendicular to the magnetic field to establish the crossed electric and magnetic fields (E×B) inside the chamber. Depending on the particular embodiment chosen for the present invention, a stochastic RF electric field can be generated inside the chamber in either of several ways.

For one embodiment of the present invention, an electrode (e.g. a plurality of concentric ring electrodes) is mounted at one end of the cylindrical chamber and is connected with the amplifier of the stochastic input. With this connection, the frequencies of the RF electric field will include all frequencies in the frequency interval that is passed by the band pass filter. In variations of this embodiment, an electrostatic electric field can also be established by any other means well known to the skilled artisan.

In another embodiment of the present invention, an additional electromagnetic coil can be positioned around the chamber to superpose an additional magnetic field onto the uniform magnetic field (B) in the chamber. This electromagnetic coil can then be connected with the amplifier and activated with frequencies in the frequency interval to induce an electric field in the chamber. It is to be appreciated that, if desired, only selected portions of the chamber need to be influenced by the electromagnetic coil. Thus, the effect of the stochastic cyclotron ion filter can be localized.

Regardless of how the RF electromagnetic field is generated for the present invention, it is preferable that the particles to be collected from the multi-species plasma have a collisional frequency (ν) inside the chamber that satisfies the condition $\omega_2-\omega_1 \geqq \nu$. Under this condition, more charged particles having a cyclotron frequency Ωwithin the frequency interval ($\omega_1<\Omega<\omega_2$) will be selectively accelerated into large orbital paths in the chamber. The selectively accelerated particles can then be separated from the background ions and collected.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
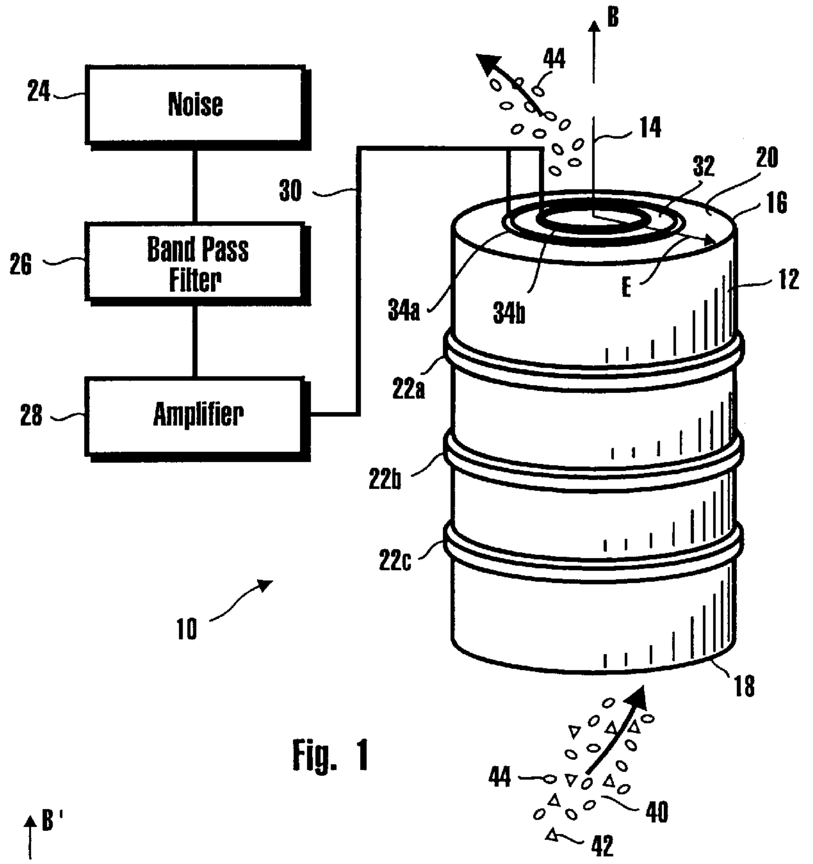
FIG. 1 is a perspective view of a chamber for a stochastic cyclotron ion filter in accordance with the present invention, wherein a stochastic input interacts with the electrode of an electrostatic electric field to create an RF electric field in the chamber.

Referring initially to FIG. 1, a stochastic cyclotron ion filter in accordance with the present invention is shown and is generally designated 10. As shown, the filter 10 includes a substantially cylindrical shaped chamber 12 that generally defines a longitudinal axis 14. Further, the chamber 12 has an end 16 and an end 18 with a wall 20 that extends longitudinally between the ends 16 and 18. For the present invention, the chamber 12 will also include structure (not shown) at the ends 16 and 18 that will allow a partial vacuum to be established inside the chamber 12.

FIG. 1 also shows that the filter 10 includes a plurality of magnetic coils 22, of which the magnetic coils 22*a*, 22*b* and 22*c* are exemplary. As shown, these magnetic coils 22*a–c* are positioned on the outside of the wall 20 and they are each individually oriented to lie in a plane that is substantially perpendicular to the longitudinal axis 14. With this configuration, an activation of the magnetic coils 22*a–c* will generate a substantially uniform magnetic field (B) in the chamber 12 that is oriented substantially parallel to the longitudinal axis 14. As intended for the present invention, the magnetic coils 22*a–c* can be activated in any manner well known in the pertinent art. Further, in lieu of the magnetic coils 22*a–c*, any structure known in the art that is capable of generating a substantially uniform magnetic field (B) in the chamber 12 can be used for the present invention.

As shown in FIG. 1, the stochastic input for use in the filter 10 requires several components. These components are: a noise source 24, a band pass filter 26, and an amplifier 28. More specifically, the noise source 24 can be of any type well known in the art that is capable of generating white noise. The band pass filter 26, which is connected to the noise source 24, will then block all frequencies in the white noise from noise source 24 that are outside a predetermined frequency interval (bandwidth). Stated differently, the band pass filter 26 will pass all frequencies in the frequency interval between $\omega_1$ and $\omega_2$. The amplifier 28 is then used to amplify or strengthen these frequencies in the frequency interval.

For the embodiment of the present invention shown in FIG. 1, the amplifier 28 is connected via a line (connection) 30 with an electrode 32 that is located at the end 16 of the chamber 12. It will be appreciated that a similar connection to a similar electrode (not shown) at the end 18 of chamber 12 is also possible. Further, the electrode 32 can be of any type that is well known to the skilled artisan. For example, as shown in FIG. 1, the electrode 32 includes a plurality of concentric rings 34 (ring 34*a* and ring 34*b* are exemplary). Acting together, the rings 34 of electrode 32 will generate the electric field (E) in the chamber 12. Due to the connection of the electrode 32 with the amplifier 28, the result required for the present invention will be an RF electric field (E) that includes all frequencies in the frequency interval between the frequencies $\omega_1$ and $\omega_2$.

Figure 2:
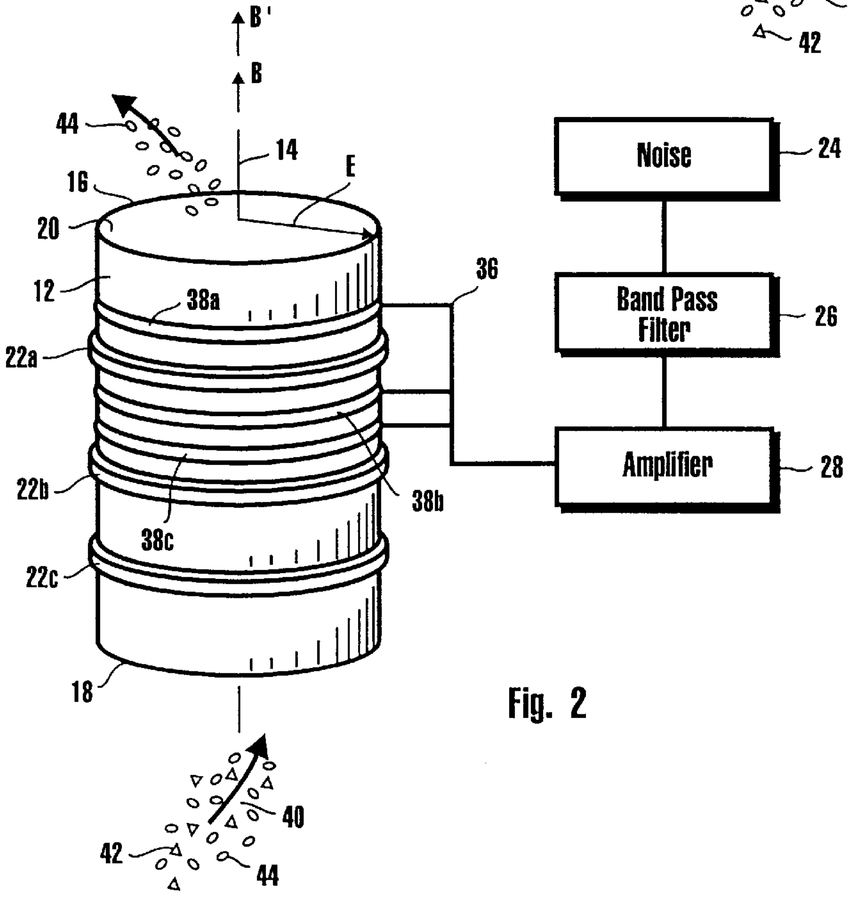
FIG. 2 is a perspective view of a chamber for a stochastic cyclotron ion filter in accordance with the present invention, wherein a stochastic input interacts with an electromagnetic coil to induce an RF electric field in the chamber.

For the alternate embodiment of the present invention shown in FIG. 2, the amplifier 28 is connected via a line (connection) 36 with at least one electromagnetic coil 38 (the electromagnetic coils 38*a*, 38*b* and 38*c* are exemplary). These coils, like the magnetic coils 22 are positioned on the outside of the chamber 12, and they are oriented to generate a magnetic field (B') that, like the magnetic field (B) is substantially parallel to the longitudinal axis 14. It is to be noted, however, that unlike the magnetic coils 22, the electromagnetic coils 38 can be selectively positioned along selected lengths of the chamber 12. For instance, as contemplated by the present invention, the electromagnetic coils 38 can extend along the entire length of the chamber 12 or, as shown in FIG. 2, extend along only part of the length of the chamber 12. In either case, the purpose of the electromagnetic coils 38 is to superpose the oscillating magnetic field (B') onto the magnetic field (B). Importantly, because the electromagnetic coils 38*a–c* that are generating the magnetic field (B') are also connected to the amplifier 28, the stochastic input from the amplifier 28 will be imposed on the magnetic field (B'). Due to the as stochastic nature of magnetic field (B'), an RF electric field (E) will be induced in the chamber 12 that will include all frequencies in the frequency interval between $\omega_1$ and $\omega_2$.

In the operation of the stochastic cyclotron ion filter 10 of the present invention, a multi-species plasma 40 is introduced into the chamber 12 by means well known in the pertinent art. For example, consider the multi-species plasma 40 as being generated from a nuclear a waste. In this case, the plasma 40 will include high mass number particles 42 having mass numbers in an approximate range of 235 to 240 (transuranic elements) and in an approximate range of 80–120 (fission fragments) and there will be other material particles 44 having mass numbers substantially lower than particles 42. Further, in accordance with the particular mass number of the particles 42, they will have a respective cyclotron frequency Ω.

As intended for the present invention, the cyclotron frequency Ω for particles 42 in the multi-species plasma 40 will be within the frequency interval ($\omega_1$ to $\omega_2$) of the stochastic input from amplifier 28. Consequently, the particles 42 will resonate with the electric field (E) and be accelerated into larger spiral orbits than will the particles 44 of lower mass number. Due to this resonance condition, the particles 42 are driven from the plasma 40 and into the wall 20 where they can be subsequently collected.

While the particular Stochastic Cyclotron Ion Filter (SCIF) as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A stochastic cyclotron ion filter for separating ions according to mass which comprises:

a plasma source for providing a multi-species plasma, said plasma including particles having a predetermined mass to charge ratio (M) and a cyclotron frequency ($\Omega$);

a substantially cylindrical shaped chamber for receiving said multi-species plasma therein, said chamber defining an axis;

a means for generating a substantially uniform magnetic field (B) in said chamber, said magnetic field being oriented substantially parallel to said axis in said chamber;

a means for generating a plurality of signals, said signals having frequencies in a frequency interval between a first frequency ($\omega_1$) and a second frequency ($\omega_2$), for establishing an electrical field (E) in said chamber, said electrical field being oriented substantially perpendicular to said axis to establish crossed electric and magnetic fields (E×B) in said chamber; and a means for selectively collecting said particles of mass M from said plasma, said collected particles of mass M having a cyclotron frequency $\Omega$ in said frequency interval ($\omega_1<\Omega<\omega_2$) and a collisional frequency ($\nu$) in said plasma wherein ($\omega_2-\omega_1\geqq\nu$.

2. An ion filter as recited in claim 1 wherein said means for generating said plurality of signals comprises:

a noise source;

a band pass filter connected with said noise source for passing frequencies in said frequency interval; and an amplifier connected to said band pass filter for strengthening frequencies passed by said band pass filter to generate said plurality of signals.

3. An ion filter as recited in claim 2 wherein said chamber has a first end and a second end and said ion filter further comprises an electrode mounted at said first end of said chamber, said electrode being connected with said amplifier to establish said electrical field in said chamber.

4. An ion filter as recited in claim 2 further comprising an electromagnetic coil mounted on said chamber, said electromagnetic coil being connected with said amplifier to establish said electrical field in said chamber.

5. An ion filter as recited in claim 4 wherein said electromagnetic coil is mounted on said chamber to localize said electrical field in said chamber.

6. An ion filter as recited in claim 1 wherein said chamber has a wall and said means for collecting particles having a cyclotron frequency $\Omega$ is said wall.

7. An ion filter as recited in claim 1 wherein said particles having a cyclotron frequency $\Omega$ have a mass number in a range from 235 to 240.

8. An ion filter as recited in claim 1 wherein said particles having a cyclotron frequency $\Omega$ have a mass number in a range from 80 to 120.

9. A stochastic cyclotron ion filter for separating ions in a plasma according to mass by using an electrical field (E) crossed with a magnetic field (B), said ion filter comprising:

a noise source;

a band pass filter connected with said noise source for passing frequencies in a frequency interval between a first frequency ($\omega_1$) and a second frequency ($\omega_2$);

an amplifier connected to said band pass filter for strengthening frequencies in said frequency interval to establish said electrical field (E); and a means for selectively collecting particles from said plasma, said collected particles having a cyclotron frequency $\Omega$ in said frequency interval ($\omega_1<\Omega<\omega_2$) and a collisional frequency ($\nu$) in said plasma wherein $\omega_2-\omega_1\geqq\nu$, and wherein said cyclotron frequency $\Omega$ is resonant with said electric field (E).

10. An ion filter as recited in claim 9 wherein said filter further comprises:

a substantially cylindrical shaped chamber for receiving said multi-species plasma therein, said chamber defining an axis; and a means for generating a substantially uniform magnetic field (B) in said chamber wherein said magnetic field (B) is oriented substantially parallel to said axis in said chamber.

11. An ion filter as recited in claim 10 wherein said chamber has a first end and a second end and said ion filter further comprises an electrode mounted at said first end of said chamber, said electrode being connected with said amplifier to establish said electrical field (E) in said chamber.

12. An ion filter as recited in claim 10 further comprising an electromagnetic coil mounted on said chamber, said electromagnetic coil being connected with said amplifier to establish said electrical field (E) in said chamber.

13. An ion filter as recited in claim 12 wherein said electromagnetic coil modulates said magnetic field (B) in time to induce said electric field (E).

14. An ion filter as recited in claim 12 wherein said electromagnetic coil is mounted on said chamber to localize said electrical field (E) in said chamber.

15. An ion filter as recited in claim 12 wherein said chamber has a wall and said means for collecting particles having a cyclotron frequency $\Omega$ is said wall.

16. An ion filter as recited in claim 13 wherein said particles of mass M have a cyclotron frequency $\Omega$ with a mass number in a range from 235 to 240.

17. An ion filter as recited in claim 12 wherein said particles of mass M have a cyclotron frequency $\Omega$ with a mass number in a range from 80 to 120.

18. A method for separating ions in a multi-species plasma according to mass which comprises the steps of:

introducing said multi-species plasma into a substantially cylindrical shaped chamber, said chamber defining an axis and said plasma including particles having a predetermined mass to charge ratio (M) with a cyclotron frequency ($\omega$);

generating a substantially uniform magnetic field (B) in said chamber, said magnetic field being oriented substantially parallel to said axis in said chamber;

generating a plurality of signals for establishing an electrical field (E) in said chamber, said signals having frequencies in a frequency interval between a first frequency ($\omega_1$) and a second frequency ($\omega_2$) and said electrical field being oriented substantially perpendicular to said axis to establish crossed electric and magnetic fields (E×B); and selectively collecting particles of mass M from said plasma, said collected particles having a cyclotron frequency $\Omega$ in said frequency interval ($\omega_1<\Omega<\omega_2$) and a collisional frequency ($\nu$) in said plasma wherein $\omega_2-\omega_1\geqq\nu$, and wherein said cyclotron frequency $\Omega$ is resonant with said electric field (E).

19. A method as recited in claim 18 wherein said step of generating said plurality of signals is accomplished using a noise source, a band pass filter connected with said noise source for passing frequencies in said frequency interval, and an amplifier connected to said band pass filter for strengthening frequencies passed by said band pass filter to generate said plurality of signals.

20. A method as recited in claim 19 wherein said chamber has a first end and a second end and wherein said step of generating said plurality of signals is accomplished using an electrode mounted at said first end of said chamber, said electrode being connected with said amplifier to establish said electrical field (E) in said chamber.

21. A method as recited in claim 19 wherein said step of generating said plurality of signals is accomplished using an electromagnetic coil mounted on said chamber, said electromagnetic coil being connected with said amplifier to modulate said magnetic field (B) to induce said electrical field (E) in said chamber.

* * * * *

UNITED STATES PATENT AND TRADEMARK OFFICE

CERTIFICATE OF CORRECTION

PATENT NO. : 6,515,281 B1 Page 1 of 1
DATED : February 4, 2003
INVENTOR(S) : Tihiro Ohkawa It is certified that error appears in the above-identified patent and that said Letters Patent is hereby corrected as shown below:

<u>Column 2,</u>
Line 31, delete "$Mdv_y/dt = -ev_x$" insert -- $Mdv_y/dt = -ev_xB$ --
Line 50, delete "F[1]" inert -- $F[\omega]$ --

<u>Column 3,</u>
Line 15, delete "$E = [\omega_2\ \omega_1]F$" insert -- $E = [\omega_2 - \omega_1]F$ --

<u>Column 4,</u>
Line 2, delete "$(\omega_2\text{-}\omega_2 \geqq \upsilon)$." -- insert -- $(\omega_2\text{-}\omega_1 \geqq \upsilon)$. --

<u>Column 6,</u>
Line 34, delete "as"

<u>Column 7,</u>
Line 25, delete "$(\omega_2\text{-}\omega_1 \geqq \upsilon$" insert -- $\omega_2\text{-}\omega_1 \geqq \upsilon$ --

<u>Column 8,</u>
Line 34, delete "13" insert -- 12 --
Line 45, delete "$(\omega)$;" insert -- $(\Omega)$; --

Signed and Sealed this

Twenty-fourth Day of June, 2003

JAMES E. ROGAN
*Director of the United States Patent and Trademark Office*